Feb. 6, 1951     A. J. ROOT, SR     2,540,350
ROTARY MOWER
Filed March 4, 1946     2 Sheets-Sheet 1
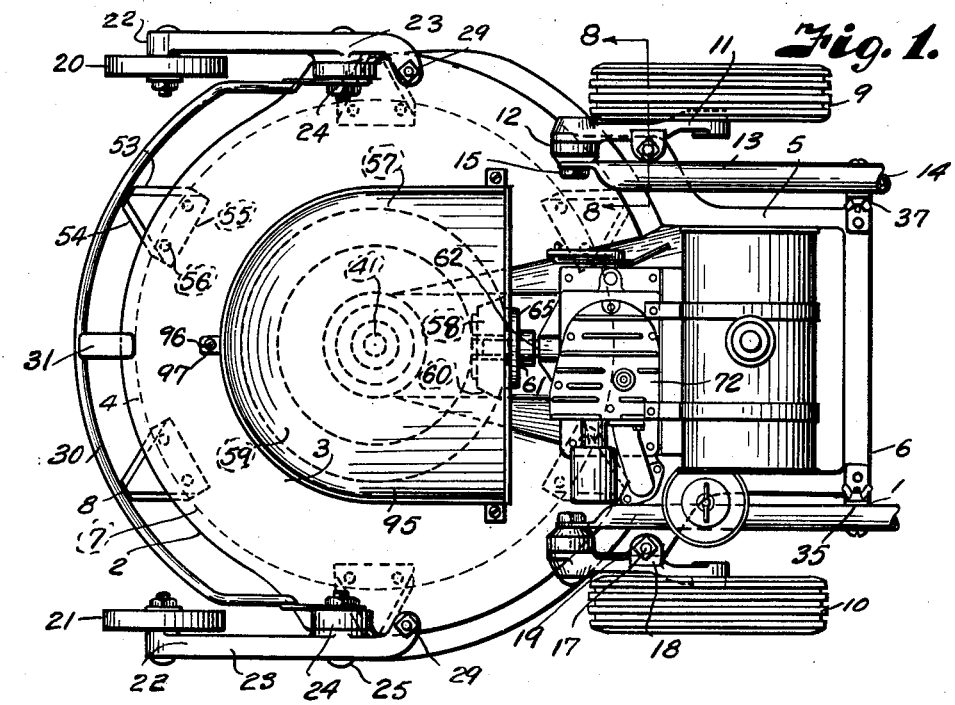
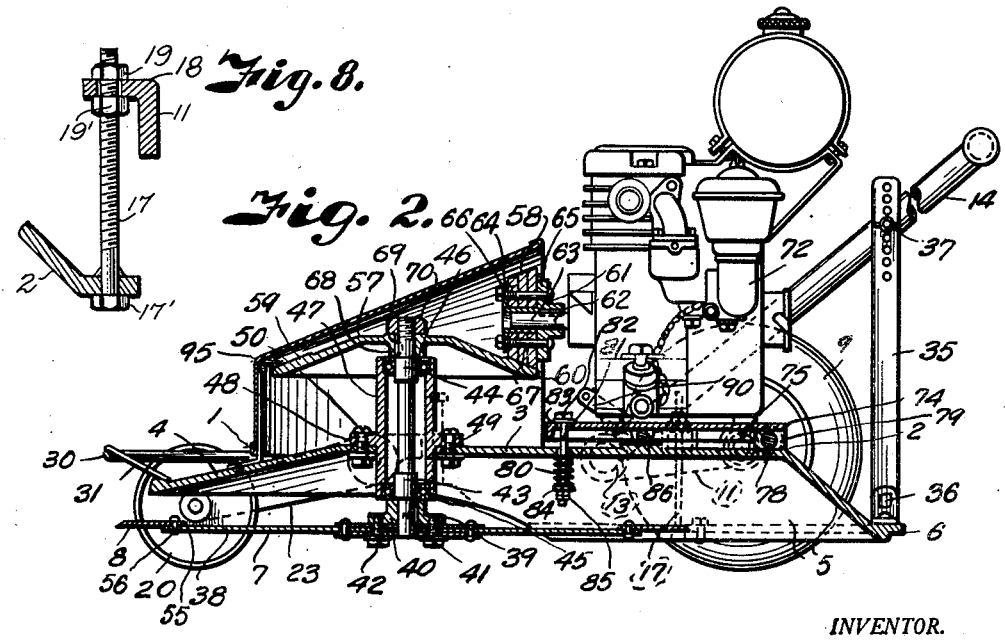
INVENTOR.
Arthur J. Root, Sr.
BY
Fishburn & Mullendore
ATTORNEYS.

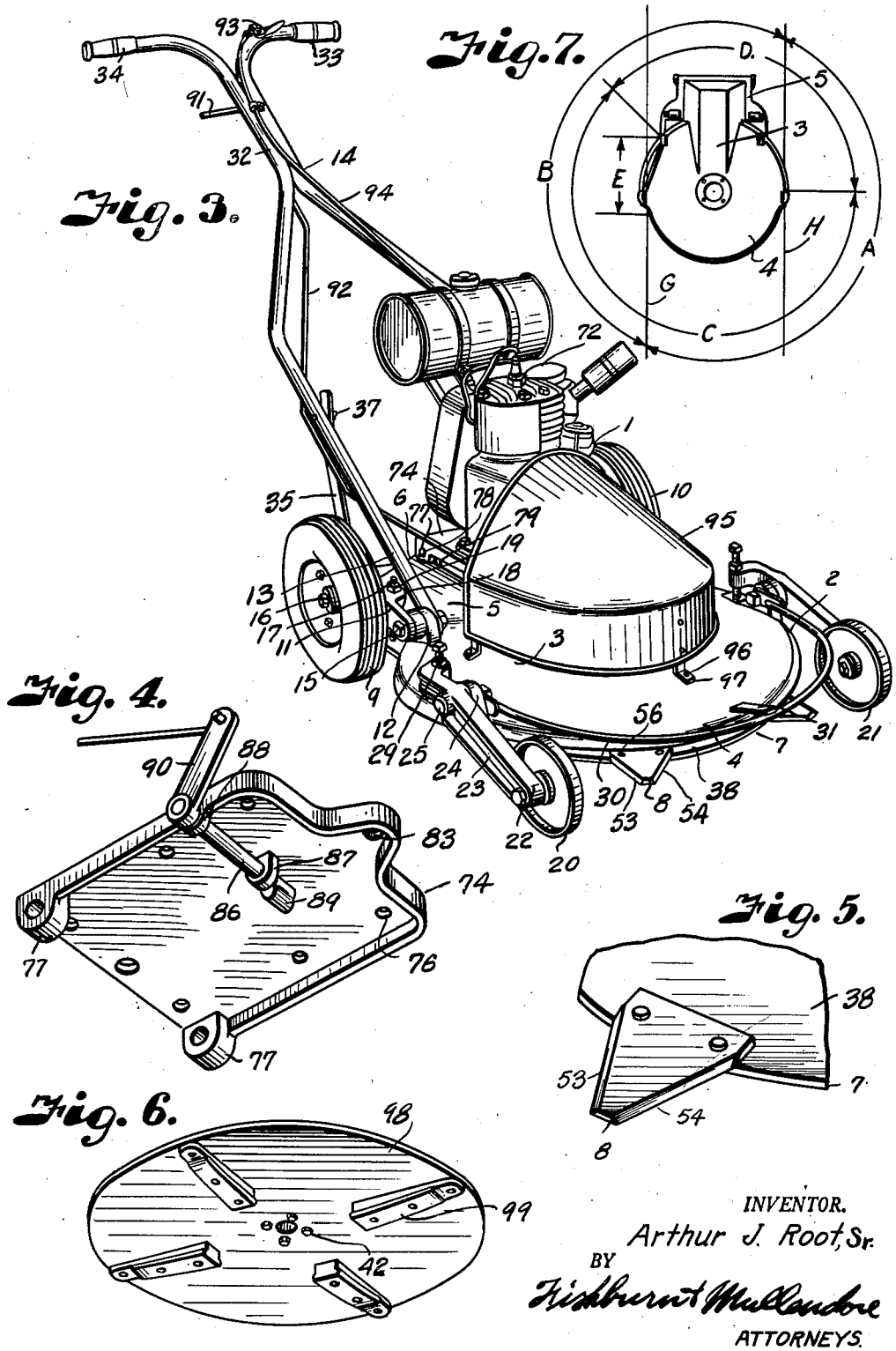

Patented Feb. 6, 1951

2,540,350

UNITED STATES PATENT OFFICE 2,540,350

ROTARY MOWER

Arthur J. Root, Sr., Baxter Springs, Kans.

Application March 4, 1946, Serial No. 651,680

5 Claims. (Cl. 56—25.4)

This invention relates to mowers particularly of the rotary type and has for its principal objects to provide a mower of this character with a simple and efficient driving connection between the rotor and its prime mover; to provide a movable mounting of the prime mover on the mower for facilitating disengagement of the driving member of the prime mover from the driven element of the rotor so as to stop operation of the rotor while maintaining the prime mover in operation; and to provide a substantially positive drive for the rotor of the mower under normal operation.

Other objects of the invention are to provide a wheel arrangement whereby the main load carrying wheels of the mower are within the swath cut by the rotor so that the wheels do not bend down the grass before it is cut; to provide a simple lever mounting of the wheels so that they may be readily adjusted to vary the cutting height by screw threaded adjusting means; to provide a mower frame which allows direct contact of the uncut grass by the knives of the rotor but which amply protects the operator from objects thrown out through actuation of the rotor; and to provide a mower structure adapted to be fulcrumed on the main wheels so as to facilitate maneuvering of the mower.

In accomplishing these and other objects of the invention hereinafter pointed out, I have provided improved structure, the preferred forms of which are illustrated in the accompanying drawings wherein:

Fig. 1 is a plan view of a mower constructed in accordance with the present invention.

Fig. 2 is a longitudinal central section through the mower but showing the motor in elevation.

Fig. 3 is a perspective view of the mower.

Fig. 4 is an underneath perspective view of the motor mounting member.

Fig. 5 is a fragmentary perspective view of the rim of the cutter element of the rotor showing one of the knife elements.

Fig. 6 is an underneath perspective view of a modified form of rotor disk which adapts the mower for other purposes.

Fig. 7 is a diagrammatic plan view of the frame.

Fig. 8 is a section through the adjustment support for the rear wheels taken on the line 8—8 of Fig. 1.

Referring more in detail to the drawings:

1 designates a power mower constructed in accordance with the present invention and which includes a frame 2 having a substantially flat top portion 3 and a downwardly and outwardly sloping substantially circular front portion 4 joining at the sides with more steeply inclined skirt portions 5 on the sides and back of a rearward extension 6, the skirt portions 5 projecting below the rotational path of the cutting elements of a rotor 7 to protect the operator from objects that might be picked up and thrown rearwardly by the rotor. The forward portion of the frame in front of the transverse diameter and the right-hand side (Fig. 1) up to the rearward extension 6 terminate above the cutting elements of the rotor to facilitate passage of the grass to be cut into contact with the rotor. The forward portion of the frame in front of the transverse diameter is also of less radius than the sides as shown in Figs. 1 and 3 to expose the cutting elements 8 on the rotor. The rearmost portion 6 is substantially narrower than the forward portion to provide spaces for main wheels 9 and 10 to operate within the swath cut by the rotor as later described. The wheels 9 and 10 are journalled on lever-like arms 11 pivotally fixed at one end to ears 12 that project upwardly from the frame and also serve to attach the ends 13 of a yoke-shaped handle 14 later described. The ends of the handle 13 and lever arms are secured to the ears by fastening devices such as bolts 15. The opposite ends of the arms carry the wheel spindles 16 and are adjusted to vary the center of the wheels relatively to the height of the frame so as to vary the cutting height of the rotor. The adjustment is effected by bolts 17 having heads 17' suitably attached to the sides of the frame and which have threaded shanks that extend upwardly through laterally turned ears 18 on the lever arms 11, adjusting nuts 19 and 19' being provided on the shanks of the bolts to engage the respective sides of the ears.

The forward end of the frame is supported on relatively narrow wheels 20 and 21 that are rotatably mounted on the forward ends 22 of the lever arms 23 pivotally connected with upstanding ears 24 located on the sides of the frame slightly forward of the center of the circular portion thereof as best shown in Fig. 1, the lever arms being connected with the ears by bolts 25 that extend therethrough and through the ears as shown in Fig. 1. The lever arms have rear ends 28 carrying set screws 29 adjustably mounted in the arms and engaging the upper edge of the frame to the rear of the ears 24. The fastening devices 25 also provide a pivotal support for the ends of a guard 30 above the front edge of the frame and projecting forwardly thereof as shown in Fig. 1 to prevent contact of the cutting elements of the rotor with trees or other objects into which the mower may be maneuvered as in cutting up close to such objects. The guard 30 preferably comprises a rod and has a central portion supported by a bracket 31 adapted to rest upon the frame as shown in Figs. 1 and 2. With the guard in the position illustrated the grass merely bends thereunder as the machine is moved along the ground, however, when cutting tall weeds that do not bend, it is necessary to swing the guard to an out of way position about its pivotal connections.

The handle 14 may be formed of tubes shaped to provide the arms 13 and which are bent inwardly and joined together as at 32 from where the arms extend laterally and are provided with handle grips 33 and 34. The handle is fixed relative to the frame by links 35 pivoted to the rear of the frame as at 36 and adjustably connected with the arms of the handle by fastening devices 37 that are projected through the handles and through one of a series of openings in the links. It is obvious that by changing the position of the fastening device into one or the other of the openings the angle of the handle may be varied to adjust it to a convenient position for the operator. By thus fixing the handle, the handle may be used for fulcruming the frame on the main wheels to lift the forewheels off the ground and thereby facilitate maneuvering of the machine.

The rotor includes a disk-like member 38 secured to the flange 39 of a head 40 on a shaft 41 by fastening devices such as cap screws 42 extending through suitable openings in the disk and into threaded openings of the flange as best shown in Fig. 2. The shaft 41 has spaced bearing portions 43 and 44 seating the inner races of antifriction bearings 45 and 46 which have their outer races supported in shouldered recesses at the respective ends of a sleeve-like bracket 47 that has an annular flange 48 intermediate its ends to support the sleeve-like bracket in vertical position within a central opening 49 in the flat portion of the frame, the flange of the sleeve-like bracket being secured by fastening devices 50 extending through suitable openings in the flange and through registering openings in the frame. The fastening devices preferably comprise bolts having heads engaging the flanges and nuts threaded thereon and engaging the underface of the frame member as shown in Fig. 2. The heads depend from the lower end of the sleeve-like bracket and carry the disk 38 at the cutting level. The disk substantially corresponds in diameter to the front of the circular portion of the frame so that cutting elements 8 mounted thereon project beyond the forward edge of the frame to contact the material to be cut. The cutting elements preferably comprise ordinary sickle blades having diverging cutting edges 53 and 54 projecting from the periphery of the disk. The base portion 55 of the blade overlaps the disk and is secured thereto by fastening devices such as rivets 56 in the same manner as a sickle blade is usually attached to the sickle bar of a mowing machine. The blades are located so that the pointed ends thereof are within the boundary of the guard 30.

In order to actuate the shaft 41, the upper end projects from the sleeve-like bracket and carries a member 57 adapted to be driven by a driving member 58. The member 57 is preferably in the form of a truncated cone and has an annular face 59 circumferentially of the base thereof which is engaged by a bevel face 60 of the driving member. The driving member 58 includes a hub 61 that is secured to the projecting end of a shaft 62 on a prime mover by a spline 63. The driving face of the member 58 is of composite construction and includes a series of friction rings 64 that are clamped between a flange 65 on the hub 61 and a ring 66 by means of bolts 67 passing through suitable openings in the flanges and registering openings in the friction rings. The driven member includes a hub 68 that is secured on the shaft 41 by a key 69 and a nut 70. The prime mover 72 may be electrically operated or it may be an internal combustion engine as illustrated in the drawings. The engine, as illustrated, is mounted on a motor platform 74 with suitable fastening devices 75 extending through openings 76 shown in Fig. 4. The opposite rear corners of the platform have depending ears 77 (Fig. 4) for pivotal support on a cross shaft 78 having its ends journalled in ears 79 on opposite sides of the rear portion of the frame. The motor being located on the platform 74, pivots in the direction of the driven member 57 so that the driving member 58 is retained in driving contact therewith by reason of the weight of the engine supplemented by pressure of a compression spring 80. The spring 80 is sleeved on a shank 81 of a bolt 82 that extends through an opening 83 in the platform and through an opening in the frame so that the spring may be mounted on the end of the bolt and retained by a spring seat 84 backed by adjusting nuts 85 so that the spring acts to pull the motor platform downwardly and enhance driving contact of the driving member with the driven member.

Means is provided for relieving the driving contact between the driving and driven members so that the motor may continue to operate and the rotor remain stationary. This is effected by a rock shaft 86 pivotally mounted in ears 87 and 88 projecting from the bottom of the platform and which carries a cam 89 adapted to bear upon the top of the frame when the rock shaft is operated in one direction to raise the forward portion of the motor platform against action of the spring 80. The shaft projects beyond the side of the platform as shown in Fig. 4 and carries an arm 90 that is connected with an operating lever 91 on the handle by a rod 92. The throttle of the motor may be manipulated by a lever 93 pivoted adjacent the handle grip 33 and which is suitably connected with the throttle of the engine by a flexible shaft 94. If desired, the driving and driven members may be covered by a hook-like guard 95 that is placed thereover and secured to the frame by fastening devices 96 extending through feet 97 on the guard as best shown in Figs. 1, 2 and 3.

The modified form of disk 98 shown in Fig. 6 is equipped on the underface thereof with a plurality of radially arranged brackets 99 for attaching various tools such as abrasive blocks, brushes and the like so that the device may be adapted for other purposes than cutting grass.

In using the mower constructed and assembled as described, the disk 38 of the rotor 7 is adjusted for the desired cutting height. This is effected by loosening the set screws 29 and moving them in the required direction to bring the knife at the proper level. A corresponding adjustment may be made in the rear wheels 9 and 10 by manipulating the bolts 17. The machine is pushed along the grass to be cut by the operator holding onto the handle grips 33 and 34.

With the engine 72 in operation, the lever 91 is shifted so that the cam 89 lowers the motor mounting platform 74 to bring the driving member 58 to contact with the driven member 57, which contact is maintained responsive to weight of the engine supplemented by action of the spring 80. Upon contact of the driving member 58, the driven member 57 is rotated by friction to effect rotation of the knives 8 into contact with the grass as the mower is pushed thereover.

When it is desired to stop operation of the rotor without stopping the motor, the lever 91 is shifted in the opposite direction to move the cam 89 into contact with the top of the frame 1 and raise the motor platform 74 against action of the spring 80. This rocking of the motor platform on its shaft 78 raises the driving member 58 out of driving contact with the driven member 57.

Attention is directed to the fact that the depth of the sides of the frame bears a certain relation with the grass as indicated in Fig. 7. The width of the swath to be cut is between the parallel lines G and H. The grass in front of the mower contained between the lines G and H is uncut grass and the grass between the lines G and H rearwardly of the transverse diameter of the blade sweep is cut grass. Asssuming that the mower is moving along the side of a cut swath to the left of Fig. 7, the uncut grass in contact with the depending edge of the frame extends through the distance represented by the letter A while the arc B designates cut grass. In other words, all that portion of the edge of the frame through the arc B is moving over cut grass. The front and the left side of the edge of the frame represented by the arc C, Fig. 7, is for example 1½ inches above the blades of the rotor. The part indicated by the arc D is, for example, about ¾ inch below the blades. Thus, the uncut grass indicated by arc A closes the space under the edge indicated by the arc A. Since the edge of the frame through the arc D extends below blades, the cut grass closes that portion below the frame represented by the arc D. The portion E, Fig. 7, is moving over cut grass but as above stated the edge through the arc C is 1½ inches above the blades. Therefore, a space is provided between the lower edge of the frame and the cut grass for the distance illustrated by E to provide for discharge of the cuttings and air from under the frame. This gives a fan effect to suck uncut grass into contact with the knives at the front of the machine and provides a forced discharge of the grass cuttings at the side of the machine through the space indicated at E.

In the form of the invention shown in Fig. 6 the knife blades are omitted from the disk and various tools applied to the brackets 99 depending upon the purpose for which the mower is to be used.

From the foregoing it is obvious that I have provided a mower having a simple and efficient driving connection between the rotor and prime mover and that by pivotal mounting of the prime mover I have provided a simple arrangement for disconnecting engagement of the driving member with the driven member. It is also obvious that I have provided a mower which is well adapted for cutting grass and other materials in a safe and efficient manner.

What I claim and desire to secure by Letters Patent is:

1. A mower of the character described including a frame providing a rotor chamber, a rotor in the rotor chamber, knives on the rotor, said frame having a depending front edge portion spaced above the knives to pass grass thereunder and form a seal by uncut grass when the mower is in use, the frame also having a part of a depending side and the rear portion extending below the knives and into contact with grass cut by the knives, and an edge portion of the side spaced above the knives at the side over the cut grass to form an outlet for air and cuttings from the rotor chamber.

2. A mower including, a mobile support, a rotor having knives, a vertical shaft journalled in the support and carrying the rotor below said support, a driven member on the shaft above said support, a motor base, means for pivotally connecting a side of the motor base opposite the driven member to the support on a transverse horizontal axis, a rock shaft carried on the underside of the motor base, a cam on said rock shaft for engagement with the top of the support, a motor on the base and having a driving shaft projecting over the driven member, a driving member on the projecting end of the driving shaft and adapted to frictionally engage the driving member, and means for actuating the rock shaft to effect engagement of the cam with the support to raise and lower the motor base to effect engagement and disengagement of the driving member with the driven member.

3. In a mower of the character described including a frame having a housing portion of substantially circular form and a rearward extension, lugs on opposite diametrical sides of said housing portion of the frame, arms pivotally connected with said lugs and extending forwardly of the housing, wheels carried by forward ends of said arms to support the forward end of the frame, said arms having rearwardly extending portions projecting over the frame, set screws carried by said portions of the arms and bearing against the frame to adjust support of the frame by said front wheels, lugs carried by the frame at substantially the juncture of said rearwardly extending portion with the circular housing portion, arms pivotally connected with said lugs and extending rearwardly along sides of said rearwardly extending portion of the frame, wheels journalled on rearward ends of said last named arms, means for adjusting the last named arms relative to the frame for varying the height of the rear portion of the frame as carried by said last named wheels, said means including threaded bolts having shanks extending through ears on said last named arms and having connnection with said frame, and nuts threaded on said shanks and engaging respective sides of said ears.

4. A mower of the character described including a frame providing a rotor chamber and having an arcuate front edge portion, a rotor in the chamber, knives on the rotor having cutting edges projecting beyond said arcuate front edge of the frame, an arcuate guard of longer radius than the arcuate front edge of the frame and having rearwardly extending ends, transverse pivots connecting the rear ends with said frame to support said arcuate guard in front of the path of said knives, said arcuate guard being pivotally retractable on said transverse pivots to move said guard from guarding relation with said knives.

5. A mower of the character described including a frame providing a rotor chamber and having an arcuate front edge portion, a rotor in the chamber, knives on the rotor having cutting edges projecting beyond said arcuate front edge of the frame, an arcuate guard of longer radius than the arcuate front edge of the frame and having rearwardly extending ends, transverse pivots connecting the rear ends with said frame to support said arcuate guard in front of the path of said knives, said arcuate guard being pivotally retractable on said transverse pivots to move said guard from guarding relation with said knives, and a support bracket on the forward portion of the arcuate guard for engaging the forward portion of the frame when the guard is swung forwardly on said transverse pivots.

ARTHUR J. ROOT, Sr.

REFERENCES CITED

The following references are of record in the file of this patent:

UNITED STATES PATENTS

| Number | Name | Date |
|---|---|---|
| 683,704 | Partridge | Oct. 1, 1901 |
| 1,622,611 | Sera | Mar. 29, 1927 |
| 1,868,347 | Cloud | July 19, 1932 |
| 1,871,606 | Haddad | Aug. 16, 1932 |
| 2,032,784 | Worthington | Mar. 3, 1936 |
| 2,166,450 | Smalley | July 18, 1939 |
| 2,253,452 | Urschel | Aug. 19, 1941 |
| 2,278,922 | Goodall | Apr. 7, 1942 |
| 2,308,076 | Hainke | Jan. 12, 1943 |
| 2,312,972 | Orr | Mar. 2, 1943 |
| 2,329,185 | Coddington | Sept. 14, 1943 |
| 2,390,321 | Packwood | Dec. 4, 1945 |
| 2,448,074 | Bishop | Aug. 31, 1948 |

FOREIGN PATENTS

| Number | Country | Date |
|---|---|---|
| 1,700 | Australia | Nov. 26, 1936 |
| 100,118 | Australia | Jan. 28, 1937 |